(12) United States Patent
Tharman et al.

(10) Patent No.: US 6,542,074 B1
(45) Date of Patent: Apr. 1, 2003

(54) MONITORING SYSTEM FOR AN INTERNAL COMBUSTION ENGINE

(75) Inventors: Paul Tharman, Pewaukee, WI (US); William H. Reitman, Fox Point, WI (US); Gary J. Gracyalny, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 173 days.

(21) Appl. No.: 09/651,693

(22) Filed: Aug. 30, 2000

(51) Int. Cl.[7] .................................................. B60Q 1/00
(52) U.S. Cl. .................... 340/457.4; 340/438; 340/439; 340/450.3; 701/29; 701/30
(58) Field of Search .............................. 340/457.4, 439, 340/438, 450.2, 450.3; 235/97; 701/21, 29, 30; 40/503

(56) References Cited

U.S. PATENT DOCUMENTS

| 4,004,361 | A | | 1/1977 | McVeety ..................... 40/77.6 |
|---|---|---|---|---|
| 4,023,137 | A | | 5/1977 | Olsbo et al. ................... 340/59 |
| 4,506,337 | A | | 3/1985 | Yasuhara ..................... 364/550 |
| 4,593,263 | A | | 6/1986 | Peckworth ................... 340/52 |
| 4,630,027 | A | * | 12/1986 | Muhlberger et al. ..... 340/457.4 |
| 4,706,193 | A | | 11/1987 | Imajo et al. ................. 364/424 |
| 4,742,476 | A | | 5/1988 | Schwartz et al. |
| 4,862,393 | A | * | 8/1989 | Reid et al. ................. 340/457.4 |
| 4,876,529 | A | | 10/1989 | Kubota et al. ........... 340/450.3 |
| 4,887,068 | A | | 12/1989 | Umehara ................. 340/450.3 |
| 4,970,492 | A | | 11/1990 | King ....................... 340/450.3 |
| 5,092,429 | A | | 3/1992 | Linares et al. |
| 5,644,491 | A | | 7/1997 | Fiske et al. |
| 5,705,977 | A | | 1/1998 | Jones .......................... 340/457 |
| 5,723,779 | A | * | 3/1998 | Hara et al. .................. 73/118.1 |
| 6,037,864 | A | | 3/2000 | Sem et al. ................. 340/457.4 |
| 6,128,561 | A | * | 10/2000 | Janata .......................... 701/29 |
| 6,222,445 | B1 | * | 4/2001 | Beckhusen ................... 340/457 |
| 6,239,694 | B1 | * | 5/2001 | Honda et al. ................ 340/457 |

FOREIGN PATENT DOCUMENTS

EP           0420099 A2     4/1991

* cited by examiner

*Primary Examiner*—Toan Pham
(74) *Attorney, Agent, or Firm*—Michael Best & Friedrich LLP

(57) ABSTRACT

The invention provides a monitoring system for monitoring an internal combustion engine. The monitoring system includes a power source having a winding and a magnet that magnetically interacts with the winding to generate a winding signal. The monitoring system further includes a conditioner that conditions the winding signal to generate a conditioned signal, a counter circuit powered by the conditioned signal that outputs an indication signal, and a visual or audible indicator that provides indication to the user upon receiving the indication signal.

49 Claims, 4 Drawing Sheets

MONITORING SYSTEM FOR AN INTERNAL COMBUSTION ENGINE

BACKGROUND OF THE INVENTION

The present invention relates to a monitoring system for an internal combustion engine and, particularly, to a monitoring system including an internal combustion engine monitor for informing an operator when to perform engine maintenance.

There are many types of internal combustion engines. Some internal combustion engines use a battery and transformer for creating a sparking signal for combusting the fuel. Other internal combustion engines have a magnet that interacts with an ignition coil for generating an ignition signal that is used for the combustion event. For the second type of engine, the ignition signal is conditioned and provided to an engine spark generating circuit for generating the spark of the combustion event. The ignition signal (see e.g., FIG. 2) typically has leading and trailing quarter-cycles of one polarity and a center half-cycle of the opposite polarity. Additionally, the center half-cycle is much larger in amplitude then the leading and trailing quarter-cycles, and typically only the center half-cycle is for combusting the fuel.

In addition, some prior art internal combustion engines include monitoring systems for informing an operator to perform engine maintenance (e.g., change oil). The monitoring system may be in the form of a module attached to the engine. Known prior art monitoring systems use a second power source (e.g., a battery, a solar power cell, etc.) for generating the power to monitor the engine. However, providing a battery or a similar power source increases costs and space requirements for the module.

SUMMARY OF THE INVENTION

Accordingly, the invention provides a monitoring system for monitoring an internal combustion engine. The monitoring system includes a power source having a winding, and a magnet that magnetically interacts with the winding, to generate a winding signal. The winding preferably includes an ignition coil.

The monitoring system further includes a conditioner that conditions the winding signal to generate a conditioned signal, a counter circuit powered by the conditioned signal that outputs an indication signal when engine maintenance is recommended, and a visual or audible indicator that provides an indication to the user upon receiving the indication signal. The indication signal may inform the operator to change the engine oil, change the engine air-filter, or other engine maintenance activity. Alternatively, the indication signal may inform the operator the number of hours the engine has ran or the number of revolutions a flywheel of the engine has completed.

The invention is an improvement over the prior art because the counter circuit is powered by the conditioned winding signal. Thus, unlike prior art engines, the invention does not require a secondary power source such as a battery or solar cell. By not requiring a secondary power source, the invention saves space and reduces costs. In addition, if the winding signal is the engine ignition signal, then the invention can utilize the unused portion of the ignition signal for powering the monitoring system (e.g., the positive quarter-cycles). Therefore, the invention better utilizes the existing components of the engine. Moreover, because the counter circuit is powered by the conditioned winding signal, the counter circuit functions only when the engine is running. That is, when the engine is not running, then the counter circuit does not receive the conditioned winding signal and, consequently, the counter circuit does not count. This is an improvement over the prior art because prior art monitoring circuits include a secondary power source that may count when the engine is not running. For example, in some prior art monitoring systems, if a key for the engine is left in an "on" position, then the counter circuit would increase its count even if the engine is not running. However, for the monitoring system of the invention, because the system is powered by the conditioned winding signal, the monitoring system will only count when the engine is running.

Preferably, the visual indicator includes a light-emitting diode; the conditioner includes a rectifying circuit; and the counter circuit includes a microcontroller or processor, and software for operating the microcontroller. The software operates the microcontroller to count the amount of time the microcontroller receives the conditioned signal and to provide the indication signal to the indicator when the microcontroller counts a predetermined time period. Alternatively, the counter circuit includes a timer that counts the amount of time the timer receives the conditioned winding signal and provides the indication signal to the indicator when the timer counts a predetermined time period.

The monitoring system may further include a second visual or audible indicator that provides a second output in response to a second indication signal. Additionally, the monitoring system may further include a sensing circuit comprising a sensor and a third indicator connected in circuit. The sensing circuit is connected to the conditioner and is capable of sensing an engine condition (e.g., a low oil pressure condition, a high-engine temperature condition, or even a low oil condition). The third indicator provides an indication to the operator that maintenance is recommended when the sensor senses the condition.

The invention further provides a module capable of being electrically connected to an internal combustion engine. The module may be retrofitted onto existing engines. The module includes a conditioner that conditions the winding signal to generate a conditioned signal, a counter circuit powered by the conditioned signal that outputs an indication signal when engine maintenance is recommended, and a visual or audible indicator that provides indication to the user upon receiving the indication signal. The module is preferably a stand-alone module.

Other features and advantages of the invention will become apparent by consideration of the detailed description and accompanying drawings.

DETAILED DESCRIPTION

Figure 1:
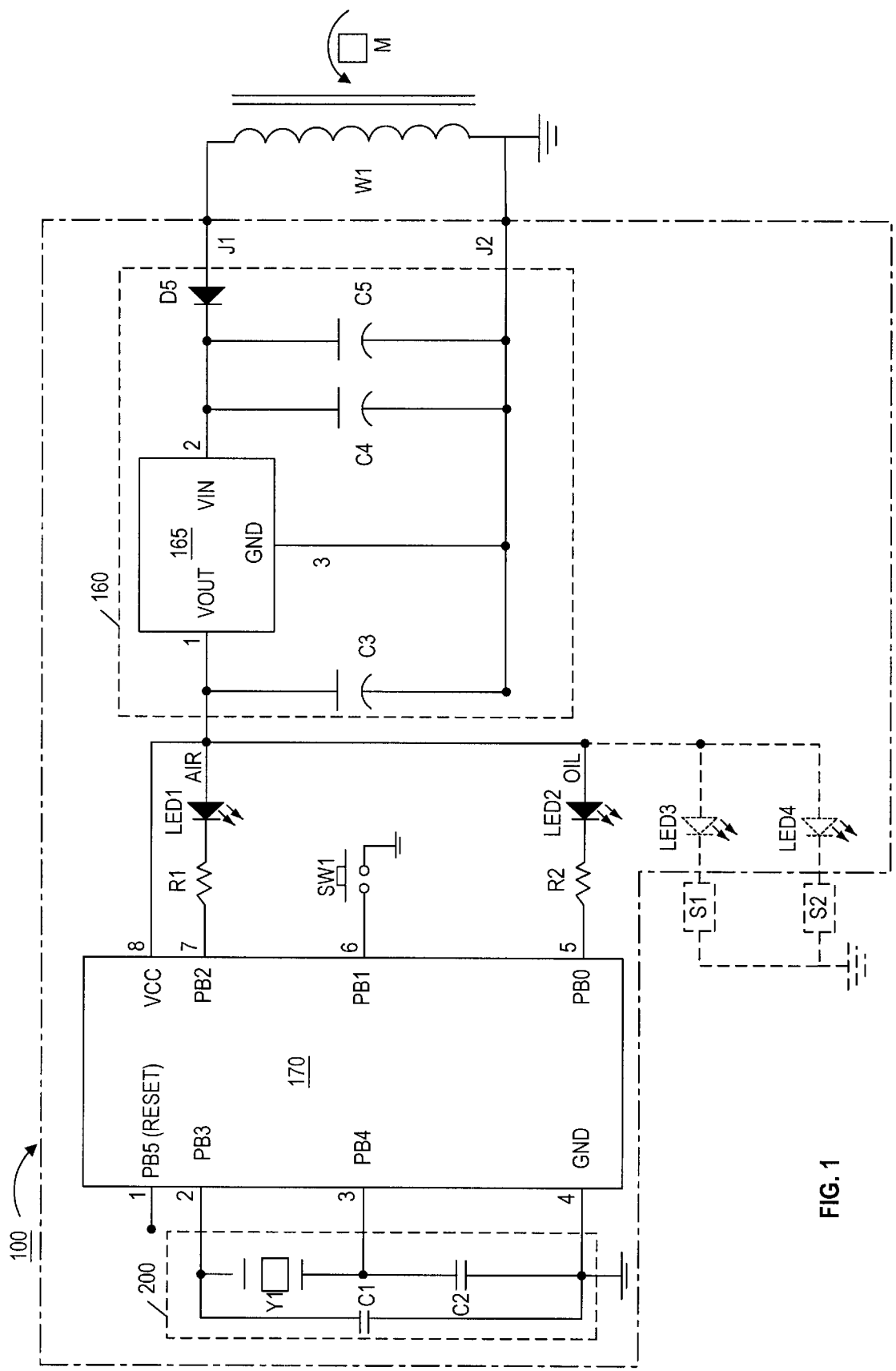
FIG. 1 is an electrical schematic of a monitoring system embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

A monitoring system 100 embodying the invention is systematically shown in FIG. 1. The monitoring system 100 includes a winding W1 disposed on an engine ignition coil frame for an internal-combustion engine. The internal combustion engine can be an engine for any apparatus but, preferably, is an engine for a vegetation-cutting device (e.g., a lawnmower). The winding W1 is preferably the ignition coil, however the winding can be a stand-alone winding.

Figure 2:
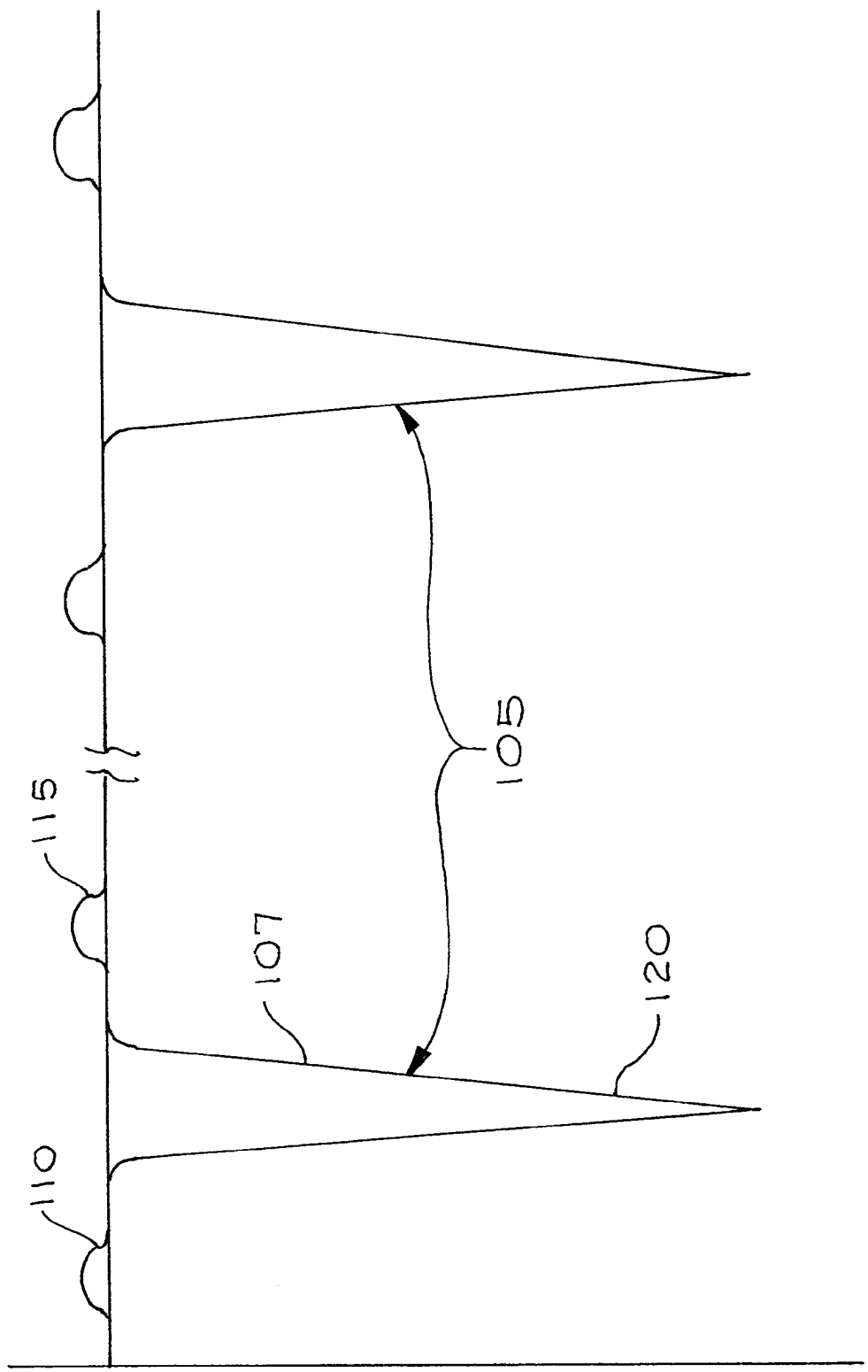
FIG. 2 is an exemplary winding signal being generated in a winding.

As shown in FIG. 2, the winding W1 generates a winding voltage signal 105 having a winding voltage waveform 107. The voltage waveform 107 is generated each time flywheel magnet M passes the winding W1. The winding waveform typically has leading and trailing quarter-cycles 110 and 115 of one polarity and a center half-cycle 120 of the opposite polarity. The center half-cycle 120 of waveform 105 has significantly higher amplitude than the leading and trailing half-cycles 110 and 115 and is used for engine ignition.

Figure 3:
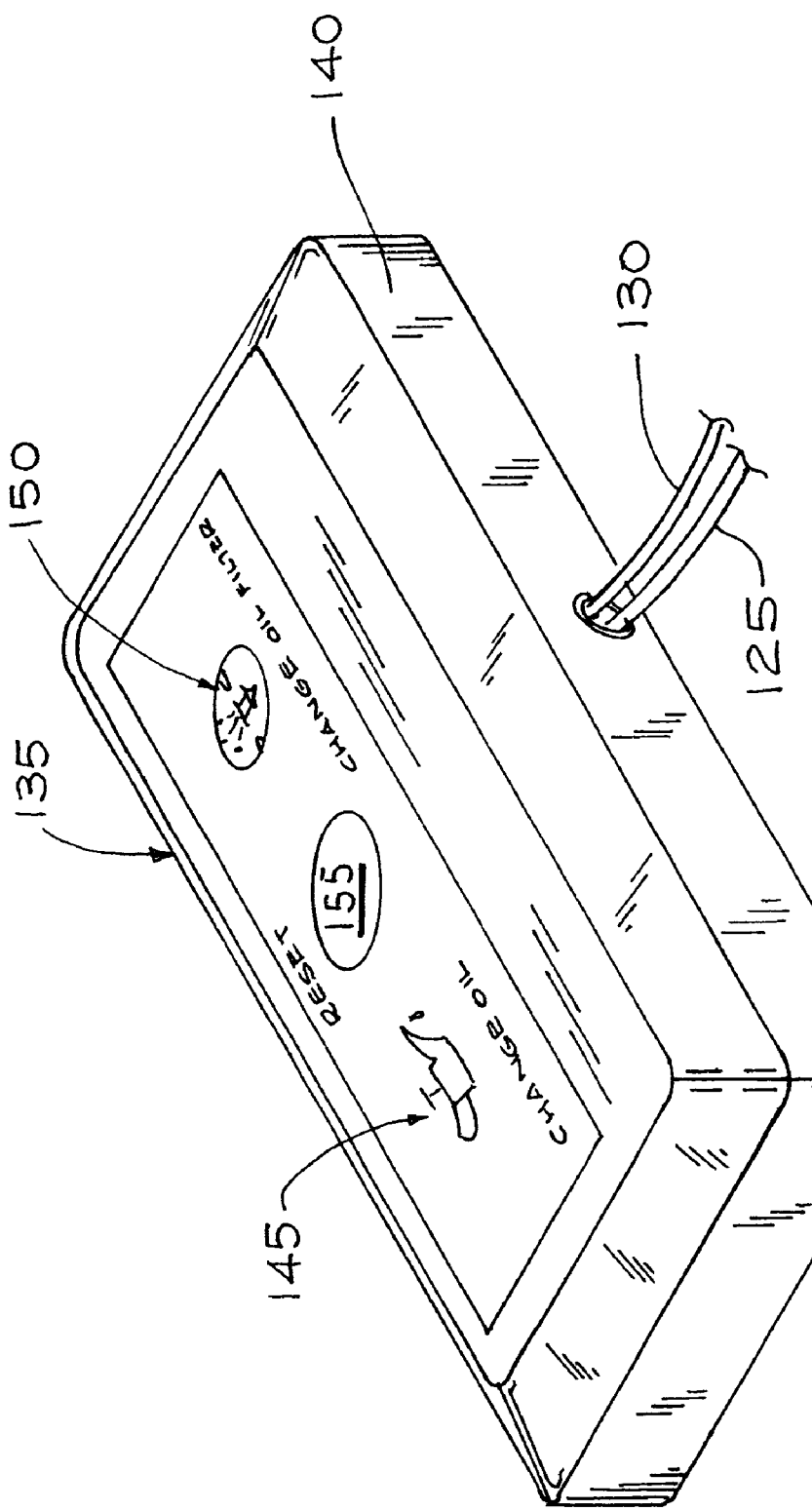
FIG. 3 is a perspective view of a monitor embodying the invention.

Referring to FIG. 3, the monitoring system further includes leads 125 and 130, and module 135 (also schematically shown in FIG. 1). The leads 125 and 130 are connected to respective ends of the winding W1 and provide the winding signal to the module 135. Preferably, the module 135 is a stand-alone module having a housing 140. Alternatively, the module can be incorporated into an instrument panel, an engine housing, or similar arrangement. The housing 140 includes a change oil indicator 145 and a change air filter indicator 150 for informing an operator to perform engine maintenance when either indicators 145 or 150 are lit. Of course, other indicators can be added to the module 135. In addition, either indicator 145 or 150 can be an incremental indicator such as an hourmeter or a tachometer. The module 135 further includes a reset button 155 mounted within the housing 140.

Referring back to FIG. 1, the monitor 135 includes a conditioner 160 that conditions the winding signal 105 and generates a conditioned signal. Preferably, the conditioner 160 includes a rectifying circuit having a diode D4 connected in series with capacitors C4 and C5. The rectifying circuit may have a resistor connected in parallel with the capacitors C4 and C5. The conditioner further includes a voltage regulator 165, and a capacitor C3. The voltage regulator 165 is preferably a Motorola LM3480IM3.3 integrated circuit. To condition the winding signal, the rectifying circuit rectifies the conditioning signal resulting in a substantially direct current (DC) signal having a DC offset and an alternating current (AC) ripple. The substantially DC signal is then provided to the voltage regulator 165, which regulates the substantially DC signal to a five volt DC signal. Capacitor C3 is connected to the output of voltage regulator 165 and filters the five volt DC signal. Although FIG. 1 shows the conditioner 160 being internal to the monitor 135, the conditioner 160 can be located external to the monitor 135.

The monitoring system further includes a counter circuit 170. The counter circuit 170 is powered by the conditioned signal at pin 8 and preferably outputs an indication signal at pins 5 or 7 when engine maintenance is recommended. Alternatively, the counter circuit 170 may output an indication signal used for an incremental counter (e.g., an hourmeter). The counter circuit 170 also receives a reset signal when an indication signal is generated at pins 5 or 7, and when the reset button 155 is depressed. Although FIG. 1 shows the counter circuit 170 being internal to the monitor 135, the counter circuit 170 can be located external to the monitor 135.

Figure 4:
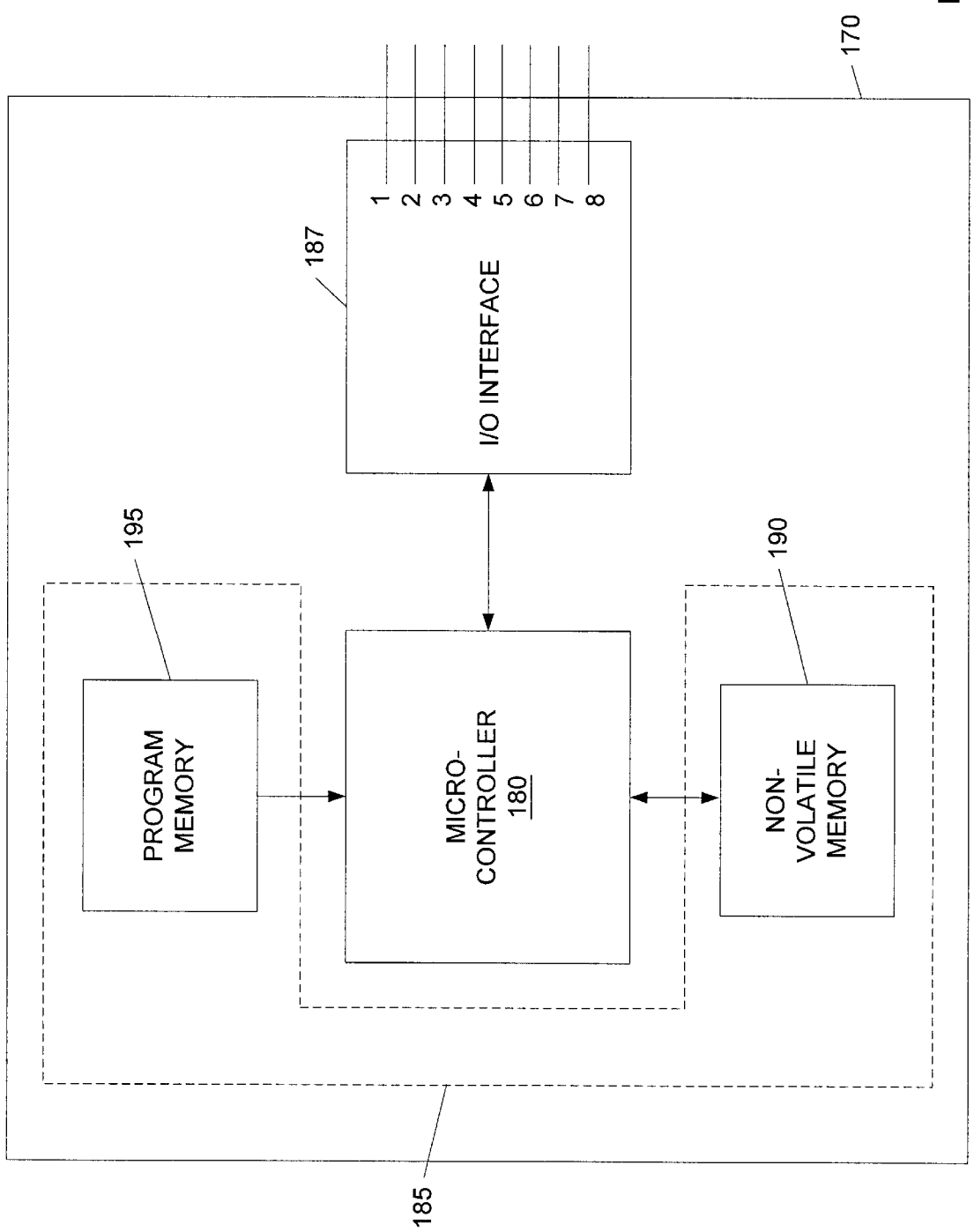
FIG. 4 is a schematic of the preferred counter circuit of the invention.

With reference to FIG. 4, the counter circuit 170 includes a microcontroller 180, internal memory 185, and an input/output (I/O) interface 187. The internal memory 185 includes nonvolatile memory 190, such as EEPROM memory or flash memory, and program memory 195. The microcontroller 180 implements a software program stored in program memory 195. An exemplary software program is a program for counting or clocking the time the microcontroller receives a conditioned signal. The I/O interface 187 includes integrated circuitry for controlling inputs received by and outputs generated to external circuitry of the counter circuit 170.

Preferably, the counter circuit 170 is implemented on an Atmel Atting12L-4S chip. Alternatively, the counter circuit 170 can include a timer capable of counting or clocking the amount of time the timer receives a conditioned signal. Of course, other counter circuits or counting devices can be used.

The monitor 135 further includes a first light-emitting diode LED1 and a second light-emitting diode LED2. Both the first and second light-emitting diodes LED1 and LED2 are connected to counter circuit 170. The first light-emitting diode LED1 provides the light source for the change oil indicator 145, and the second light-emitting diode LED2 provides the light source for the change air filter indicator 150. Of course, other light sources can be used for the indicators 145 and 150 and, alternatively, the indicators 145 and 150 may be an audible indicator or a counting device (e.g., an hourmeter). Even further, the monitor 135 may include LED drivers and/or resistors (e.g., resistors R1 and R2) for controlling the voltage being provided to the light-emitting diodes LED1 and LED2. The monitor 135 further includes an oscillator 200 serving as a clock for the control circuit 170.

As shown in phantom in FIG. 1, the monitoring system may further include a first sensor S1 and a third light-emitting diode LED3 connected in circuit with the conditioner 160, and a second sensor S2 and a fourth light-emitting diode LED4 connected in circuit with the conditioner 160. The first sensor S1 is a low-oil pressure sensor that senses a low-oil pressure condition, and the third LED3 provides the light source for a low-oil pressure indicator. The second sensor S2 is a high-engine temperature sensor that senses a high-engine temperature condition, and the fourth light-emitting diode LED4 provides the light source for a high-engine temperature condition indicator. The low-oil pressure sensor S1 and the high-engine temperature sensor S2 are known in the art and, thus, will not be discussed in greater detail. Of course, other sensors and light-emitting diodes can be used or added.

In operation, the magnet M interacts with the winding W1 to generate the winding signal 105 having the winding waveform 107. The winding waveform 107 is generated each time magnet M passes winding W1. The winding signal 105 is provided from the winding W1 to the monitor 135 via the leads 125 and 130.

Once the monitor 135 receives the winding signal 105, the signal 105 is provided to the conditioning circuit 160. The conditioning circuit 160 conditions the winding signal 105, resulting in a conditioned signal. The conditioned signal is preferably a five volt DC signal. Once the engine has properly started, the conditioned signal has a sufficient DC voltage to power the counter circuit 170.

The resulting conditioned signal is then provided to the microcontroller 180 of the counter circuit 170 via pin 8. Upon receiving the conditioned signal, the microcontroller 180 initiates a software program for counting or clocking the time the microcontroller 180 is active. For example, in the preferred embodiment, the microcontroller 180 first boots-up and obtains from program memory 195 the software program of the invention for execution. While executing the software program, the microcontroller 180 obtains a latest counted number from nonvolatile memory 190 (e.g., 0000000000000000). The microcontroller 180 then periodically records an incremented new value (e.g., 0000000000000001) in nonvolatile memory 190. For example, the microcontroller 180 may increment the new value every six seconds. After recording the new value, the software compares the newly recorded value with a stored time period value (e.g., 0111010100110000, which represents 50 hours when starting from 0000000000000000 and using six-second increments). If the newly recorded value is equal to the time period value, then the software records a Maintenance Recommended State (e.g., change airfilter or change engine oil). The Maintenance Recommended State results in one of the light-emitting diodes LED1 or LED2 activating (e.g., LED1 "lights"). For example, the microcontroller applies a low or zero logic value to pin 7 resulting in a current flow from the conditioner 160 through light-emitting diode LED1 and resistor R1. After the engine is turned off, the operator can then perform the suggested maintenance (e.g., change the engine oil). Of course, each engine maintenance condition may have a separate time period between recommended maintenance events. For example, the operator may be informed to change the engine oil every 50 hours and may be informed to change the air filter every 100 hours.

The operator can reset the module by depressing the reset button 155 and if either light-emitting diode LED1 or LED2 is active (i.e., current flows to pin 5 or 7). Depressing the reset button 155 results in a reset signal being provided to the microcontroller 180. Upon receiving the reset signal, the software calculates a new time period value for the next scheduled maintenance. For example, if the counter is at 0111111111111111, if the time period for the next maintenance is at 50 hours, and if the counter increases every six seconds, then the next time period value will be 1111010100101111. Once the counter reaches the next time period value, an indication signal will be provided.

Preferably, the software will only calculate a new time period value (i.e., reset) only after engine maintenance is recommended. That is, each time period value will be "locked-out" until a respective Maintenance Recommended State arises. For example, if neither indicator 145 or 150 is active, then no new time period value will be calculated. If both indicators 145 and 150 are active then both time period values will be recalculated. Even further, if only one indicator 145 or 150 is active, then a new time period value will be calculated for that indicator only.

For the embodiment including the first and second sensing circuits, the conditioned signal is provided to sensors S1 and S2. If a low-oil pressure condition results, a current will flow through the third light-emitting diode LED3 and sensor S1 resulting in the activation of LED3. Similarly, if a high engine temperature condition results, a current will flow through the fourth light-emitting diode LED4 and sensor S2 resulting in the activation of LED4. Once LED3 or LED4 is activated, the operator is informed that engine maintenance is recommended (e.g., add oil).

In an alternative embodiment of the invention, rather than counting time, the monitor can count the number of revolutions the magnet M completes. For example, as was discussed above, the substantially DC signal generated by the rectifying circuit contains a DC offset with an AC ripple signal. The monitor can include additional circuitry for conditioning the AC portion of the signal and the counter circuit 170 can increment a counter each time a ripple occurs. Of course, other methods can be used to calculate the number of revolutions for the engine.

In another alternative embodiment of the invention, rather than having the light-emitting diodes LED1 or LED2 be continuously active or lit in response to a Maintenance Recommended State, the diodes LED1 or LED2 may flash. For example, the first light-emitting diode LED1 may be active for a first period of time and then be inactive for a second period of time, where the active and inactive states repeatedly alternate until the reset button 155 is depressed. The alternation of the active and inactive states is referred to as periodic indication or flashing.

Even further, if the software records a Maintenance Recommended State for more than one recommended maintenance event (e.g., change engine oil and change air filter), then the counter circuit may sequentially flash the first and second light-emitting diodes LED1 and LED2. That is, both the first and second light-emitting diodes LED1 and LED2 may be active for a first period of time (e.g., three seconds) and then be inactive for a second period of time (e.g., three seconds), where the first light-emitting diode is active when the second light-emitting diode is inactive and vice-versa. Sequentially flashing light-emitting diodes LED1 and LED2 helps reduce the amount of power required for continuously activating light-emitting diodes LED1 and LED2. Therefore, for situations where power may be a concern (e.g., where LED1 and LED2 are dim when both are lit at the same time), light-emitting diodes LED1 and LED2 may sequentially flash.

As can be seen from the above, the present invention provides an internal combustion engine monitor. Various features and advantages of the invention are set forth in the following claims.

What is claimed is:

1. A monitoring system for monitoring an internal combustion engine, comprising:
   a power source, including
      an ignition winding;
      a magnet that magnetically interacts with the ignition winding so that the ignition winding generates an ignition signal having both positive and negative portions;
   a conditioner that conditions the ignition signal to generate a substantially DC conditioned signal;
   a counter circuit powered by the conditioned signal that outputs an indication signal; and
   a visual or audible indicator that provides an indication to the user upon receiving the indication signal.

2. A monitoring system as set forth in claim 1, wherein the indicator informs the user that engine maintenance is recommended.

3. A monitoring system as set forth in claim 2, wherein the engine comprises engine oil, and wherein the recommended engine maintenance is changing the engine oil.

4. A monitoring system as set forth in claim 2, wherein the engine comprises a filter, and wherein the recommended engine maintenance is changing the filter.

5. A monitoring system as set forth in claim 2, wherein the counter circuit outputs a second indication signal when engine maintenance is recommended, and wherein the monitoring system further comprises a second visual or audio indicator that provides a second indication in response to the second indication signal.

6. A monitoring system as set forth in claim 5, wherein the first and second indications are each a continuous indication.

7. A monitoring system as set forth in claim 5, wherein the first and second indications are each a periodic indication.

8. A monitoring system as set forth in claim 7, wherein the first and second periodic indications are sequential.

9. A monitoring system as set forth in claim 1, wherein the indicator informs the user of a count.

10. A monitoring system as set forth in claim 9, wherein the visual or audible indicator includes an hourmeter.

11. A monitoring system as set forth in claim 1, wherein the visual indicator includes a light-emitting diode.

12. A monitoring system as set forth in claim 1, wherein the counter circuit includes a microcontroller and software for operating the microcontroller to count the amount of time the microcontroller receives the conditioned signal and to provide the indication signal to the indicator when the microcontroller counts a predetermined time period.

13. A monitoring system as set forth in claim 12, further comprising:
a reset in communication with the microcontroller that is used to reset the amount of counted time.

14. A monitoring system as set forth in claim 12, further comprising:
a reset in communication with the microcontroller that is used to reset the amount of counted time after the microcontroller has counted the predetermined time period.

15. A monitoring system as set forth in claim 1, wherein the conditioned signal comprises a signal having a plurality of repeating events, wherein the counter circuit comprises a microcontroller and software for operating the microcontroller to count the repeating events and to provide the indication signal to the indicator when the microcontroller counts a specified number of repeating events.

16. A monitoring system as set forth in claim 15, further comprising:
a reset in communication with the microcontroller that is used to reset the number of repeating, counted events.

17. A monitoring system as set forth in claim 15, further comprising:
a reset in communication with the microcontroller that is used to reset the number of repeating, counted events after the microcontroller has counted a selected number of repeating events.

18. A monitoring system as set forth in claim 1, wherein the counter circuit comprises a timer that counts the amount of time the microcontroller receives the conditioned signal and that provides the indication signal to the indicator when the microcontroller counts a predetermined time period.

19. A monitoring system as set forth in claim 1, wherein the monitoring system further comprises a sensing circuit comprising a sensor and a second indicator connected in circuit, wherein the sensing circuit is powered by the conditioned signal, wherein the sensor is capable of sensing an engine condition, and wherein the second indicator provides an indication when the sensor senses the engine condition.

20. A monitoring system as set forth in claim 19, wherein the engine condition is a low-oil pressure condition.

21. A monitoring system as set forth in claim 19, wherein the engine condition is a high-engine temperature condition.

22. A monitoring system as set forth in claim 1, further comprising:
a reset in communication with the counter circuit that is responsive to user manipulation.

23. A monitoring system as set forth in claim 1, wherein the indication is a continuous indication.

24. A monitoring system as set forth in claim 1, wherein the indication is a periodic indication.

25. A module as set forth in claim 1, wherein the first and second periodic indications are sequential.

26. The monitoring system of claim 1, wherein said conditioner uses the positive portion of said ignition signal to generate said substantially DC conditioned signal.

27. The monitoring system of claim 1, wherein said indicator is also powered by said substantially DC conditioned signal.

28. A module capable of being electrically connected to an internal combustion engine having a power source including an ignition winding and a magnet that magnetically interacts with the ignition winding to generate an ignition signal having both positive and negative portions, the module comprising:
a conditioner that conditions the ignition signal to generate a substantially DC conditioned signal;
a counter circuit powered by the conditioned signal that outputs an indication signal; and
a visual or audible indicator that provides an indication to the user upon receiving the indication signal.

29. A module as set forth in claim 28, wherein the indicator informs the user that engine maintenance is recommended.

30. A module as set forth in claim 29, wherein the engine comprises engine oil, and wherein the recommended engine maintenance is changing the engine oil.

31. A module as set forth in claim 29, wherein the engine comprises a filter, and wherein the recommended engine maintenance is changing the filter.

32. A module as set forth in claim 29, wherein the counter circuit outputs a second indication signal when engine maintenance is recommends, and wherein the module further comprises a second visual or audio indicator that provides a second indication in response to the second indication signal.

33. A module as set forth in claim 32, wherein the first and second indications are each a continuous indication.

34. A module as set forth in claim 32, wherein the first and second indications are each a periodic indication.

35. A module as set forth in claim 28, wherein the indicator informs the user of a count.

36. A module as set forth in claim 35, wherein the visual or audible indicator includes an hourmeter.

37. A module as set forth in claim 28, wherein the visual indicator includes a light-emitting diode.

38. A module as set forth in claim 28, wherein the counter circuit includes a microcontroller and software for operating the microcontroller to count an amount of time the microcontroller receives the conditioned signal and to provide the indication signal to the indicator when the microcontroller counts a predetermined time period.

39. A module as set forth in claim 38, further comprising:
a reset in communication with the microcontroller that is used to reset the amount of counted time.

40. A module as set forth in claim 38, further comprising:
a reset in communication with the microcontroller that is used to reset the amount of counted time after the microcontroller counts the predetermined time period.

41. A module as set forth in claim 28, wherein the conditioned signal comprises a signal having a plurality of repeating events, wherein the counter circuit comprises a microcontroller and software for operating the microcontroller to count the repeating events and to provide the indication signal to the indicator when the microcontroller counts a specified number of repeating events.

42. A module as set forth in claim 41, further comprising:

a reset in communication with the microcontroller that is used to reset the number of repeating, counted events.

43. A module as set forth in claim 41, further comprising:

a reset in communication with the microcontroller that is used to reset the number of repeating, counted events after the microcontroller has counted a selected number of repeating events.

44. A module as set forth in claim 28, wherein the counter circuit comprises a timer that counts the amount of time the microcontroller receives the conditioned signal and that provides the indication signal to the indicator when the microcontroller counts a predetermine time period.

45. A module as set forth in claim 28, further comprising:

a reset in communication with the counter circuit that is responsive to user manipulation.

46. A module as set forth in claim 28, wherein the indication is a continuous indication.

47. A module as set forth in claim 28, wherein the indication is a periodic indication.

48. The module of claim 28, wherein said conditioner uses the positive portion of said ignition signal to generate said substantially DC conditioned signal.

49. The module of claim 28, wherein said indicator is also powered by said substantially DC conditioned signal.

* * * * *